(12) United States Patent
Topaz

(10) Patent No.: US 12,290,422 B2
(45) Date of Patent: May 6, 2025

(54) BITE TRAY FOR AN EDENTULOUS JAW AND METHOD OF USE

(71) Applicant: Ben Topaz, Northbrook, IL (US)

(72) Inventor: Ben Topaz, Northbrook, IL (US)

( * ) Notice: Subject to any disclaimer, the term of this patent is extended or adjusted under 35 U.S.C. 154(b) by 33 days.

(21) Appl. No.: 17/876,464

(22) Filed: Jul. 28, 2022

(65) Prior Publication Data

US 2024/0033054 A1 Feb. 1, 2024

(51) Int. Cl.
*A61C 9/00* (2006.01)
*A61C 19/05* (2006.01)

(52) U.S. Cl.
CPC ............ *A61C 9/0006* (2013.01); *A61C 19/05* (2013.01)

(58) Field of Classification Search
CPC ....... A61C 9/00; A61C 9/0006; A61C 9/0013; A61C 19/05; A61C 8/0001; A61B 5/4818; A61B 1/24; A61F 5/566
See application file for complete search history.

(56) References Cited

U.S. PATENT DOCUMENTS

| | | | |
|---|---|---|---|
| 502,164 A * | 7/1893 | Bagby | |
| 4,003,132 A * | 1/1977 | Beck | A61C 9/0006 433/42 |
| 5,076,785 A | 12/1991 | Tsai | |
| 5,102,335 A * | 4/1992 | Getz | A61C 9/0006 433/38 |
| 5,297,960 A * | 3/1994 | Burns | A61C 9/0006 433/41 |
| D372,088 S | 7/1996 | Frush | |
| 5,636,985 A * | 6/1997 | Simmen | A61C 9/0006 433/37 |
| 6,835,065 B1 * | 12/2004 | Wise | A61C 9/0006 433/37 |
| 7,273,371 B2 | 9/2007 | Massad | |
| 9,050,155 B2 | 6/2015 | Marumori et al. | |
| 9,226,801 B2 | 1/2016 | Groscurth et al. | |
| 9,433,483 B2 | 9/2016 | Suga et al. | |
| D874,654 S * | 2/2020 | Martone | D24/180 |
| D927,696 S | 8/2021 | Kurthy | |
| 2004/0219475 A1 * | 11/2004 | DiMarino | A61C 9/0006 433/38 |

(Continued)

FOREIGN PATENT DOCUMENTS

| | | | |
|---|---|---|---|
| AU | 2014366783 B2 | 1/2020 | |
| EP | 1203570 A2 | 5/2002 | |

(Continued)

OTHER PUBLICATIONS

US Dental Depot, Catalog for Articulators and Occlusors, published Feb. 6, 2019, 36 pages, https://sa.usdentaldepot.com/usdd/1/usdd_articulato.pdf.

*Primary Examiner* — Edward Moran
*Assistant Examiner* — Matthew P Saunders
(74) *Attorney, Agent, or Firm* — UB Greensfelder LLP; Benjamin D. Rotman

(57) ABSTRACT

A bite tray for an edentulous jaw configured to create bite impressions of the edentulous jaw while maintain a patient's vertical dimension of occlusion. The bite tray comprising a parabolic support structure coupled to a bite stop assembly. The parabolic support structure have maxillary and mandibular openings to allow a prosthodontist access to a visual alignment of the inner jaw while taking impressions.

7 Claims, 6 Drawing Sheets

(56) References Cited

U.S. PATENT DOCUMENTS

| | | | |
|---|---|---|---|
| 2007/0202458 A1* | 8/2007 | Walter | A61C 9/0006 |
| | | | 433/41 |
| 2009/0298007 A1* | 12/2009 | Walter | A61C 9/0006 |
| | | | 433/38 |
| 2016/0038261 A1* | 2/2016 | Tanaka | A61C 9/0006 |
| | | | 433/37 |
| 2017/0007376 A1* | 1/2017 | Kim | A61C 9/0006 |
| 2019/0201711 A1 | 7/2019 | Brawn et al. | |
| 2020/0155288 A1 | 5/2020 | Sanders | |
| 2021/0353956 A1 | 11/2021 | Scurtescu | |

FOREIGN PATENT DOCUMENTS

| | | | | |
|---|---|---|---|---|
| FR | 2250507 A * | 7/1975 | | A61C 9/0006 |
| WO | WO-2015104683 A2 * | 7/2015 | | A61C 9/0006 |

* cited by examiner

BITE TRAY FOR AN EDENTULOUS JAW AND METHOD OF USE

BACKGROUND OF THE INVENTION

The present invention generally relates to the field edentulous impression trays. More particularly, the invention relates to an edentulous bite tray and method of use for taking intraoral maxillary and mandibular bite impressions to maintain the proper vertical dimension of occlusion while creating dental prosthetics.

The vertical dimension of occlusion (VDO) has been defined as the lower facial height measured between two points when the maxillary and mandibular teeth are intercuspated. Thus, it is the vertical position of the mandible in relation to maxilla when the occluding members are in contact.

When creating dental prosthetics such as dentures or implants for an edentulous patient, a dentist will measure the VDO and attempt to recreate prosthetics that maintain the natural VDO. If the dental prosthetic device is too short or too tall, the patient's natural bite will be effected upon the installation and use of the dental prosthetic device. Any adjustment to the natural VDO may cause the patient discomfort, change the way the patient bites causing an overbite or under bite, or speaks, and may cause unintentional wear on the dental prosthetic device. Because of this it is crucial to maintain the VDO when creating dental prosthetic devices.

It is more difficult to take the VDO measurement for an edentulous patient because there are no maxillary and mandibular teeth to be intercuspated. To capture the VDO of an edentulous patient, a dentist or assistant would typically mark a first reference dot on the patient's nose tip and a second reference dot on the patient's chin center. The prosthodontist, dentist, or dental assistant would have the patient sit upright, lick their lips, and swallow leaving the lips slightly apart and relaxed. While the patient maintains this position the dentist or assistant would measure the vertical distance between the first and second reference dots. For more accurate measurements, the dentist or assistant may align a tongue depressor, or similar item, to the first and second reference dots, mark the corresponding reference dots on the tongue depressor, and take the measurement from the tongue depressor reference dot.

In terms of esthetics, an appropriately measured VDO will appear to a layman's eye as an ordinary configuration of the patient's nose, lips and chin. An excessive VDO will appear as though the patient has something stuffed into their mouth, and the patient may not even be able to close their lips.

After the VDO is taken, an impression tray with a mold impression material, such as polyvinyl siloxane (PVS), is typically used to take a maxillary and mandibular impressions of the gums over the respective alveolar ridges. The maxillary and mandibular impressions are then used to create cast models and the cast models are used to create wax rim models for the maxillary and mandibular dental prosthetics. The cast models and wax rims are placed into an articulator to simulate the jaw movement and predict the bite. After the wax rim models are created the dentist inserts the wax rim models into the patient's mouth and attempts to recreate the VDO. If the VDO is excessive, the wax rim models need to be shaved down, and if the VDO is deficient, additional wax needs to be added until the premeasured VDO is achieved. A telltale indication of an excessive VDO is a patient straining to close their lips around the wax rims during VDO determination. Conversely, a deficient VDO will appear as though the patient's mouth has collapsed, and the chin appears too close to the nose; in essence, the patient would be over-closing their mouth because there would not be enough wax on the wax rim models to maintain the proper vertical dimension of occlusion. Once the correct VDO is achieved, the dentist sends the wax rim models back out to a lab to have the final permanent prosthetics created.

The prior art process, as described, is inefficient and costly because the patient has to come into the office at least three times, the lab has to create multiple models, and there are weeks between processing times for visits and the manufacture of models.

The present invention attempts to remedy the shortcomings of prior art process by creating an additional bite tray impressions that accurately model the patients VDO thereby eliminating the need to create wax rim models and additional fittings.

SUMMARY OF THE INVENTION

In view of the above, an edentulous bite tray configured to take maxillary and/or mandibular bite impression to maintain the proper vertical dimension of occlusion while creating dental prosthetics is disclosed. The advantage of the present invention is that is allows for a single set of impressions to be made without the need to order additional wax rims and baseplates to later adjust dental prosthetics, saving time and money.

In one aspect, the edentulous bite tray comprises a parabolic support structure, a bite stop assembly coupled to the inner surface of the parabolic support structure, and a handle extending from the outer surface of the parabolic support structure. The edentulous bite tray comprises a maxillary portion configured to interface with the maxillary alveolar ridge and a mandibular portion configured to interface with the mandibular alveolar ridge.

In another aspect, the parabolic support structure comprises a maxillary opening disposed on a maxillary portion of the parabolic support structure aligned to a central lateral axis and a mandibular opening disposed on a mandibular portion of the parabolic support structure aligned to the central lateral axis.

In some aspects of the parabolic support structure, the outer parabolic support structure surface additionally comprises a central support ridge extending along at least a portion of the outer parabolic support structure surface. The central support ridge acts to provide support the inner lips of the patient providing additional comfort while the edentulous bite tray is inserted into the patient's mouth and bite impressions are being taken.

In another aspect of the parabolic support structure, the inner parabolic support structure surface comprises a plurality of impression material engagement features extending along at least a portion of the inner parabolic support structure surface. The a plurality of impression material engagement features are configured to engage impression material, such as putty, and create an impression on the impression material such that if the impressed and hardened impression material is disengaged from the edentulous bite tray the impressed and hardened impression material can be reengaged in the correct placement in the edentulous bite tray prior to creating prosthetics.

In yet another aspect, the bite stop assembly comprises a first lateral bite stop and a second lateral bite stop positioned on opposite lateral sides of the edentulous bite tray. The bite stops are coupled to the inner parabolic support structure through a plurality of struts. The respective bite stops comprise maxillary portions and mandibular portions configured to prevent a patient from inadvertently creating an under bite or overbite condition in the mold.

In some aspects of the first lateral bite and second lateral bite stop, the maxillary portions and mandibular portions further comprise a recessed portion to accommodate teeth on a jaw that is not fully edentulous.

In another aspect, a method of using edentulous bite tray to maintain the proper VDO is provided comprising the steps of measuring the VDO, taking a maxillary impression using a standard or custom maxillary impression tray, taking a mandibular impression using a standard or custom mandibular impression tray, preparing the edentulous bite tray by inserting impression material, including but not limited to putty, into the four quadrants of the edentulous bite aligned with the bicuspid portions of each quadrant, taking the bite impression by inserting the bite tray into the patient's mouth aligned to the mandibular alveolar ridge, articulating the patient's jaw towards a closed position, observing the patient's bite through the maxillary and mandibular openings in edentulous bite tray while aligning the jaw position to recreate the measured VDO.

In yet another aspect of the method, the maxillary and mandibular impressions are used as molds to cast models of the patient's upper and lower jaw to further create dental prosthetics. The cast models are placed into an articulator and the edentulous bite tray with impressions is placed on the mandibular portion of the cast models. The articulator is articulated into a closed position relative to the edentulous bite tray and prosthetics can now be created with the VDO accounted for.

The methods, systems, apparatuses are set forth in part in the description which follows, and in part will be obvious from the description, or can be learned by practice of the methods, apparatuses, and systems. The advantages of the methods, apparatuses, and systems will be realized and attained by means of the elements and combinations particularly pointed out in the appended claims. It is understood that both the foregoing general description and the following detailed description are exemplary and explanatory only and are not restrictive of the methods, apparatuses, and systems, as claimed.

BRIEF DESCRIPTION OF THE DRAWINGS

In the accompanying figures, like elements are identified by like reference numerals among the several preferred embodiments of the present invention.

Other aspects and advantages of the present invention will become apparent upon consideration of the following detailed description, wherein similar structures have similar reference numerals.

DETAILED DESCRIPTION

The foregoing and other features and advantages of the invention will become more apparent from the following detailed description of exemplary embodiments, read in conjunction with the accompanying drawings. The detailed description and drawings are merely illustrative of the invention rather than limiting, the scope of the invention being defined by the appended claims and equivalents thereof.

Figure 1:
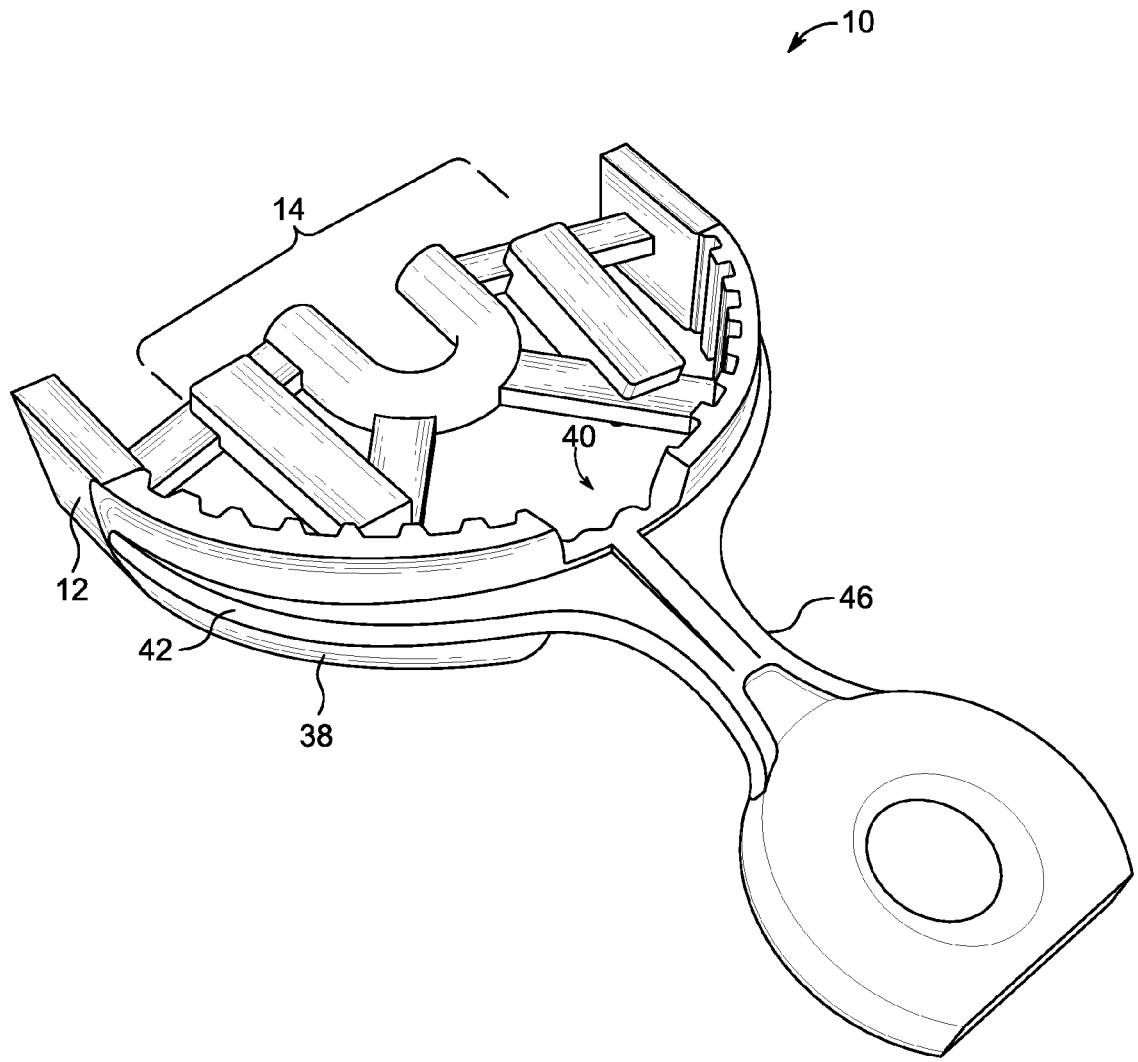
FIG. 1 is a front perspective view of an edentulous bite tray.
Figure 2:
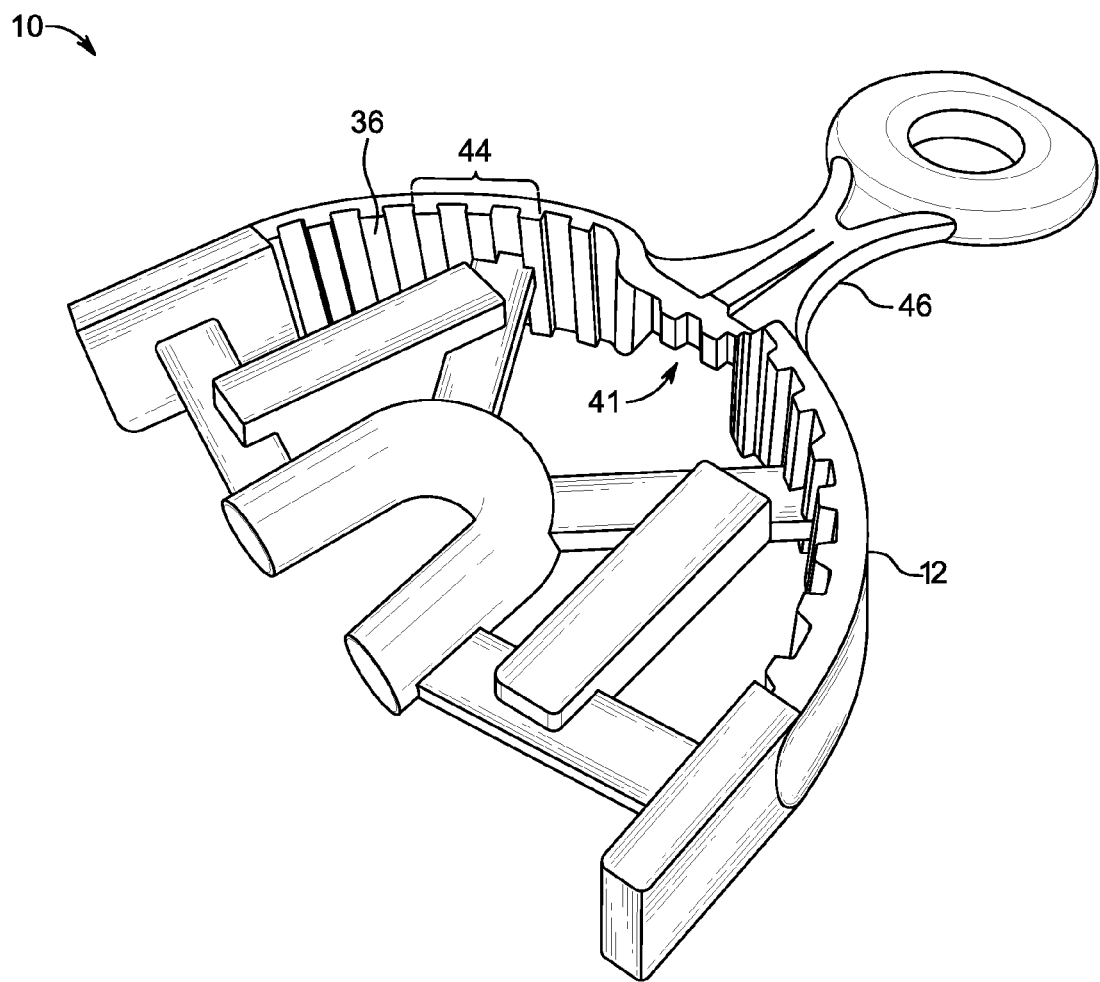
FIG. 2 is a rear perspective view of an edentulous bite tray.

FIG. 1 and FIG. 2 represent a perspective views of edentulous bite tray 10. The edentulous bite tray 10 comprises a parabolic support structure 12, a bite stop assembly 14 coupled to the parabolic support structure 12, a bite tray mid-plane C, a parabolic support structure vertex V, and a bite tray central lateral plane L extending through the parabolic support structure vertex V normal to the bite tray mid-plane C. The edentulous bite tray 10 comprises an edentulous bite tray proximal portion 11 at the parabolic support structure vertex V and an bite tray distal portion at the respective distal ends of the 13, 15 of the parabolic support structure 12.

Figure 3:
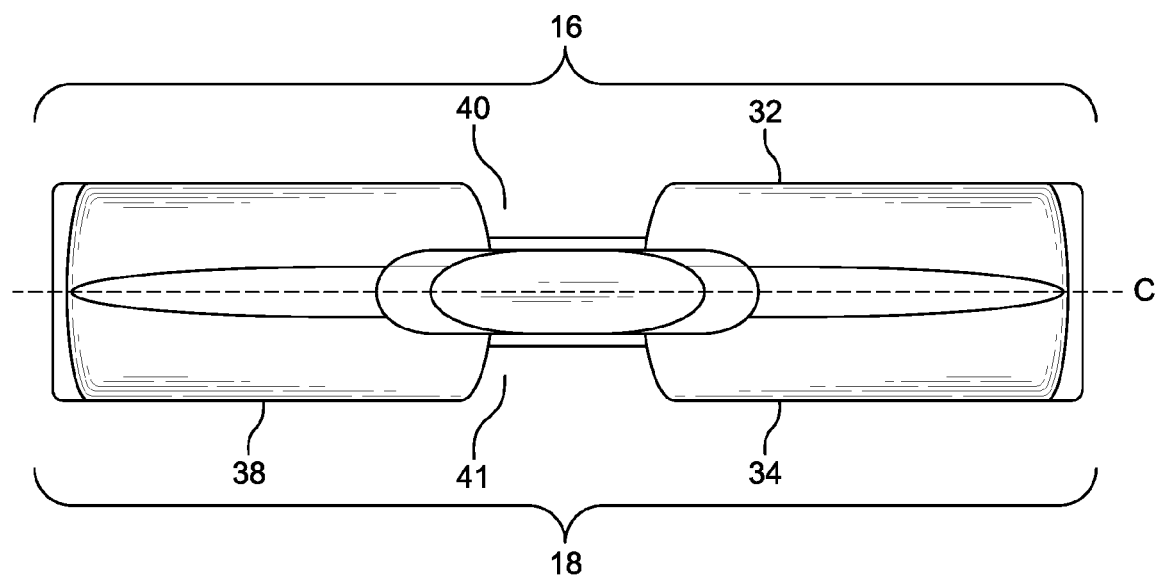
FIG. 3 is a front view of an edentulous bite tray.

For reference purposes, as shown in FIG. 3 the portion of the edentulous bite tray 10 extending above the bite tray mid-plane C can be defined as the edentulous bite tray maxillary portion 16 and the portion of the edentulous bite tray 10 extending below the bite tray mid-plane C can be defined as the edentulous bite tray mandibular portion 18.

Figure 4:
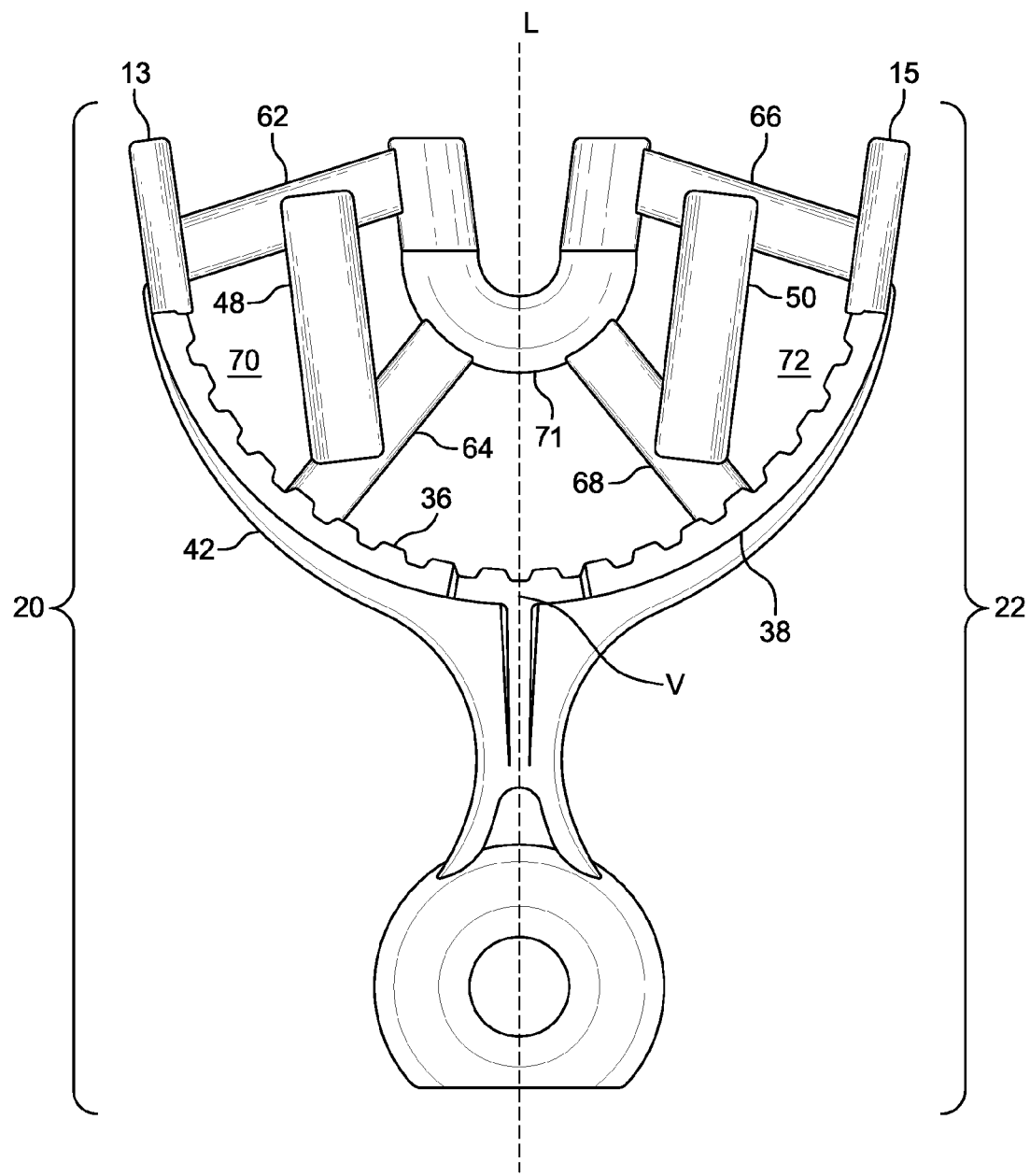
FIG. 4 is a top view of an edentulous bite tray.

Additionally, for reference purposes, as shown in FIG. 4, the edentulous bite tray 10 can be divided into an edentulous bite tray first lateral portion 20 including everything on a first side of axis L and edentulous bite tray second lateral portion 22 including everything on the opposite side of axis L.

Further, for reference purposes, the edentulous bite tray 10 can be divided into four quadrants. The edentulous bite tray first quadrant 24 is defined by a first volume bound by the edentulous bite tray maxillary portion 16 and the edentulous bite tray first lateral portion 20. The edentulous bite tray second quadrant 26 is defined by a second volume bound by the edentulous bite tray mandibular portion 18 and the edentulous bite tray first lateral portion 20. The third quadrant 28 is defined by a third volume bound by the edentulous bite tray maxillary portion 16 and the edentulous bite tray second lateral portion 22. The fourth quadrant 30 is defined by a fourth volume bound by the edentulous bite tray mandibular portion 18 and the edentulous bite tray second lateral portion 22.

The parabolic support structure 12 comprises a maxillary parabolic support structure portion 32 defined as the portion of the parabolic support structure 12 that extends a height center above the bite tray mid-plane C while a mandibular parabolic support structure portion 34 is defined as a the portion that extends from the height center below the bite tray mid-plane C. The parabolic support structure 12 additionally comprises an inner parabolic support structure surface 36 and an outer parabolic support structure surface 38. The parabolic support structure 12 further comprises a maxillary opening 40 disposed in the maxillary parabolic support structure portion 32 proximal the parabolic support structure vertex V and aligned with the bite tray central lateral plane L and a mandibular opening disposed 41 in the mandibular parabolic support structure portion 34 proximal the parabolic support structure vertex V and aligned with the bite tray central lateral plane L.

In some aspects of the parabolic support structure 12, the outer parabolic support structure surface 16 additionally comprises a central support ridge 42 extending along at least a portion of the outer parabolic support structure surface 16. The central support ridge 42 acts to provide support the inner lips of the patient providing additional comfort while the edentulous bite tray 10 is inserted into the patient's mouth and bite impressions are being taken.

In another aspect of the parabolic support structure 12, the inner parabolic support structure surface 18 additionally comprises a plurality of impression material engagement features 44 extending along at least a portion of the inner parabolic support structure surface 18. The a plurality of impression material engagement features 44 are configured to engage impression material, such as putty, and create an impression on the impression material such that if the impressed and hardened impression material is disengaged from the edentulous bite tray 10, the impressed and hardened impression material can be reengaged in the correct placement in the edentulous bite tray 10. In one example, as shown in FIG. 2 the plurality of impression material engagement features 44 comprise a set of ridges. One of skill in the art would recognize that additional ridges, ribs, openings or protrusions could act as engagement features as well.

In yet another aspect of the parabolic support structure 12, the parabolic support structure 12 further comprises an edentulous bite tray handle 46 extending outward from the outer parabolic support structure surface 16 along the bite tray central lateral plane L. The edentulous bite tray handle 46 is configured to insert and remove the edentulous bite tray 10 from the mouth of the patient. The edentulous bite tray handle 46 is also configured to act a reference marker for the midline of a patient.

The edentulous bite tray 10 additionally comprises a bite stop assembly 14 coupled to the parabolic support structure 12. The bite stop assembly 14 comprises a first lateral bite stop 48, a second lateral bite stop 50, and a plurality of struts 52 coupling the first lateral bite stop 48 and the second lateral bite stop 50 to the inner parabolic support structure surface 18.

Figure 5:
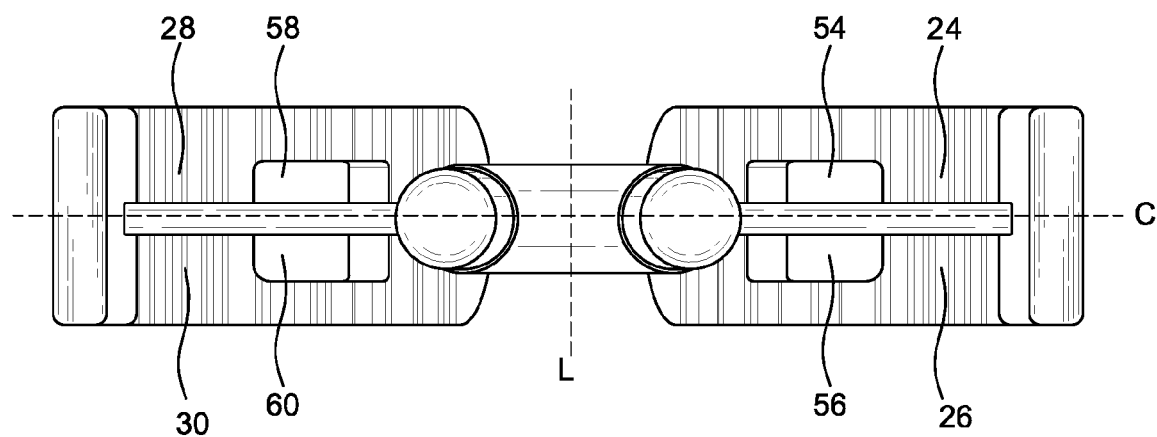
FIG. 5 is a back view of an edentulous bite tray.

As shown in FIG. 5, The first lateral bite stop 48 comprises a first lateral bite stop maxillary portion 54 extending above the bite tray mid-plane C and first lateral bite stop mandibular portion 56 extending beneath the bite tray mid-plane C. Similar to the first lateral bite stop 48, the second lateral bite stop 50 comprises a second lateral bite stop maxillary portion 58 extending above the bite tray mid-plane C and second lateral bite stop mandibular portion 60 extending beneath the bite tray mid-plane C.

The bite stop assembly 14 is positioned mid-plane the edentulous bite tray 10 and is configured with proper bites stops have proper maxillary heights and mandibular heights to provide the jaw with a reference position stop articulation into a closed position. The positioning of the bite stop assembly 14 and respective first lateral bite stop 48 and a second lateral bite stop prevent a patient from inadvertently creating an under bite or overbite condition in the mold. In one aspect of the bite stop assembly 14, the first lateral bite stop 48 is positioned within the edentulous bite tray first lateral portion 20 to correspond to the positions of what would be molars to the bicuspids on the alveolar ridge and the second lateral bite stop 50 is positioned within the edentulous bite tray second lateral portion 20 to correspond to the positions of what would be molars to the bicuspids on the alveolar ridge.

In some aspects of the edentulous bite tray 10 and bite stop assembly 14, the first lateral bite stop 48 is coupled to the inner parabolic support structure surface 36 through a first distal strut 62 and a first proximal strut 64 and second lateral bite stop 50 is coupled to the inner parabolic support structure surface 36 through a second distal strut 66 and a second proximal strut 68. In this configuration a first lateral impression material opening 70 is defined by the area bound by the first lateral bite stop 48, the first distal strut 62, the first proximal strut 64, and the inner parabolic support structure surface 36, and a second lateral impression material opening 72 is defined the area bound by the second lateral bite stop 50, the second distal strut 66, the second proximal strut 68, and the inner parabolic support structure surface 36. To provide additional stability to the edentulous bite tray 10 and respective first and second bite stops 48, 50, the first and second distal struts 62, 66 and the first and second proximal struts 64, 68, are coupled to a central support strut 71.

Figure 6:
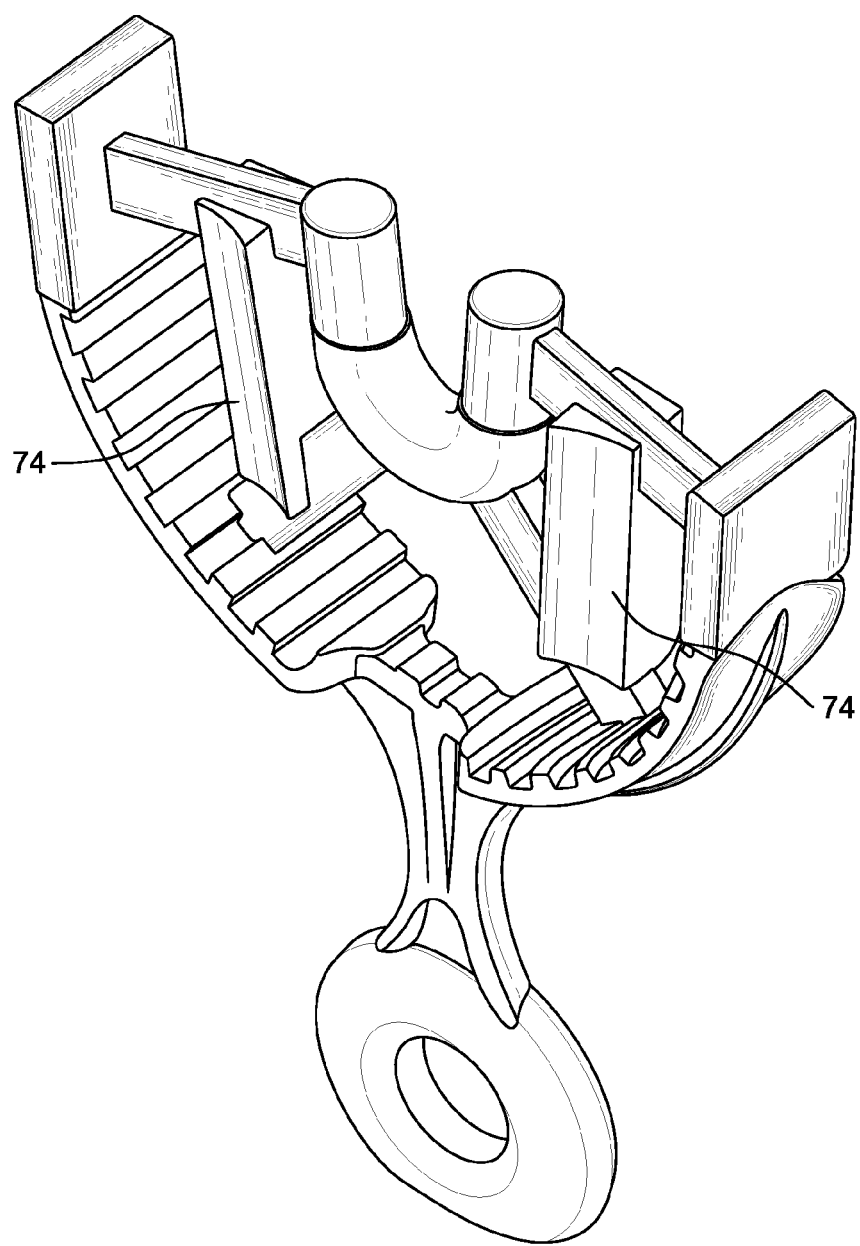
FIG. 6 is a bottom perspective view of an additional aspect of an edentulous bite tray.

In some aspects of the first lateral bite 48 and second lateral bite stop 50, the maxillary portions 54, 58 or mandibular portions 56, 60 may further comprise a recessed portion 74, as shown in an alternative embodiment in FIG. 6, to accommodate teeth on a jaw that is not fully edentulous.

It should be recognized by one of skill in the art that bite stop assembly 14 may be configured as two separate lateral portions that extend directly from inner parabolic support structure surface 36 or that the struts may be integral portions of the bite stops extending from the bite stops. It may also be contemplated by one of skill in the art that edentulous bite tray 10 may only have a single lateral bite stop to accommodate a partially edentulous jaw.

In another aspect, a method of using edentulous bite tray to maintain the proper VDO is provided comprising the steps of measuring the VDO, taking a maxillary impression using a standard or custom maxillary impression tray, taking a mandibular impression using a standard or custom mandibular impression tray, preparing the edentulous bite tray by inserting impression material into the four quadrants of the edentulous bite aligned with the bicuspid portions of each quadrant, taking the bite impression by inserting the bite tray into the patient's mouth aligned to the mandibular alveolar ridge, articulating the patient's jaw towards a closed position, observing the patient's bite through the maxillary and mandibular openings in edentulous bite tray while aligning the jaw position to recreate the measured VDO.

In yet another aspect of the method, the maxillary and mandibular impressions are used as molds to cast models of the patient's upper and lower jaw to further create dental prosthetics. The cast models are placed into an articulator and the edentulous bite tray with impressions is placed on the mandibular portion of the cast models. The articulator is articulated into a closed position relative to the edentulous bite tray and prosthetics can now be created with the VDO accounted for.

Those of ordinary skill in the art will understand and appreciate the aforementioned description of the invention has been made with reference to certain exemplary embodiments of the invention, which describe a device, system or method. Those of skill in the art will understand that obvious variations in construction, material, dimensions or properties may be made without departing from the scope of the invention which is intended to be limited only by the claims appended hereto.

The invention claimed is:

1. A bite tray for an edentulous jaw comprising:
    a bite tray mid-plane and a bite tray central lateral plane normal to the bite tray mid-plane;
    a parabolic support structure having a height center aligned to the bite tray mid-plane having a parabolic support structure vertex aligned to the bite tray central lateral plane;
    the parabolic support structure comprising an inner parabolic support structure surface and an outer parabolic support structure surface, a maxillary parabolic support structure portion extending above the bite tray mid-plane, and a mandibular parabolic support structure portion extending below the bite tray mid-plane, a first lateral parabolic support structure portion disposed on a first side of the parabolic bite tray central lateral plane and a second lateral parabolic support structure portion adjacent on a second side of the bite tray central lateral plane opposite the first side;

the parabolic support structure additionally comprising a maxillary opening disposed in the maxillary parabolic support structure proximal the parabolic support structure vertex and a mandibular opening disposed in the mandibular parabolic support structure proximal the parabolic support structure vertex and aligned to the maxillary opening, wherein the maxillary opening extends from the bite tray mid-plane to a top surface of the maxillary parabolic support structure portion and the mandibular opening extends from the bite tray mid-plane to a bottom surface of the mandibular parabolic support structure portion a height allowing visibility to a bite surface of the edentulous jaw;

a first lateral bite stop coupled to the inner parabolic support structure surface on the first lateral parabolic support structure portion, the first lateral bite stop having a first lateral bite stop maxillary portion extending above the bite tray mid-plane and a first lateral bite stop mandibular portion extending beneath the bite tray mid-plane, wherein the first lateral bite stop is coupled to a distal portion of the inner parabolic support structure surface on the first lateral parabolic support structure portion through a first distal strut and is coupled to a proximal portion of the inner parabolic support structure surface through a first proximal strut forming a first lateral impression material opening bound by the first lateral parabolic support structure portion, the first distal strut, the first lateral bite stop, and the first proximal strut;

a second lateral bite stop coupled to the inner parabolic support structure surface on the second lateral parabolic support structure portion, the second lateral bite stop having a second lateral bite stop maxillary portion extending above the bite tray mid-plane and a second lateral bite stop mandibular portion extending beneath the bite tray mid-plane, wherein the second lateral bite stop is coupled to a distal portion of the inner parabolic support structure surface on the second lateral parabolic support structure portion through a second distal strut and is coupled to a proximal portion of the inner parabolic support structure surface through a second proximal strut forming a second lateral impression material opening bound by the second lateral parabolic support structure portion, the second distal strut, the second lateral bite stop, and the second proximal strut; and wherein the first proximal strut, first distal strut, second proximal strut, and second distal strut are coupled to a central support strut.

2. The bite tray for an edentulous jaw of claim 1 wherein the first lateral bite stop mandibular portion or the second lateral bite stop mandibular portion comprise a recessed portion configured to accommodate mandibular teeth upon a bite impression.

3. The bite tray for an edentulous jaw of claim 1 wherein the first lateral bite stop maxillary portion or the second lateral bite stop maxillary portion comprise a recessed portion configured to accommodate maxillary teeth upon a bite impression.

4. The bite tray for an edentulous jaw of claim 1 further comprising a handle extending from the outer parabolic support structure surface along the bite tray central lateral plane.

5. The bite tray for an edentulous jaw of claim 1 wherein at least a portion of the outer parabolic support structure surface further comprises a central support ridge.

6. The bite tray for an edentulous jaw of claim 1 wherein at least a portion of the inner parabolic support structure surface comprises a plurality of mold engagement features configured to engage and define a tray position for bite impression material.

7. The bite tray for an edentulous jaw of claim 6 wherein the plurality of mold engagement features comprise a series of ridges.

* * * * *